(12) United States Patent
Rogers

(10) Patent No.: US 6,213,139 B1
(45) Date of Patent: Apr. 10, 2001

(54) HYBRID SOLIDS CONVEYING SYSTEM

(75) Inventor: Donald Scott Rogers, Lafayette, LA (US)

(73) Assignee: Soloco, L.L.C., Lafayette, LA (US)

( * ) Notice: Subject to any disclaimer, the term of this patent is extended or adjusted under 35 U.S.C. 154(b) by 0 days.

(21) Appl. No.: 09/435,166

(22) Filed: Nov. 5, 1999

(51) Int. Cl.[7] .............................. F16K 51/02; F04F 3/00

(52) U.S. Cl. .................. 137/1; 137/565.23; 137/565.17; 137/255; 137/263

(58) Field of Search ................ 137/565.23, 565.01, 137/565.17, 255, 263, 1

(56) References Cited

U.S. PATENT DOCUMENTS

| | | | |
|---|---|---|---|
| 5,191,910 | * 3/1993 | Eaton et al. | 137/565.23 X |
| 5,590,678 | * 1/1997 | Martinitz | 137/565.23 X |
| 5,996,621 | * 12/1999 | Hagiwara et al. | 137/565.23 X |

* cited by examiner

Primary Examiner—Kevin Lee
(74) Attorney, Agent, or Firm—William W. Stagg

(57) ABSTRACT

A system for transporting a quantity of highly viscous material comprising a vacuum chamber, a blower for creating a vacuum in the vacuum chamber, and a plurality of material suction lines for suctioning the viscous material to the chamber. A progressive cavity pump mounted to the vacuum chamber provides a continuous delivery of the viscous material from the vacuum chamber to a desired location at atmospheric pressure while the vacuum chamber is in a vacuum state. The system is skid mounted for portability.

14 Claims, 3 Drawing Sheets

HYBRID SOLIDS CONVEYING SYSTEM

FIELD OF INVENTION

The present invention generally relates to the field of removal and disposal of viscous waste material including hazardous waste. More particularly, it is concerned with an apparatus and method for transporting highly viscous liquid and sludge waste by a conveying system to a collection area for process or disposal. The material is conveyed by a hybrid pumping system comprising a vacuum pumping means in conjunction with a progressive cavity pump.

BACKGROUND OF INVENTION

There has been an increase in demand in recent years for the cleanup of environmentally contaminated areas such as landfills, waste holding ponds, and storage tanks. Such waste holding sites frequently contain sludge and highly viscous semi-solids that must be removed from theses areas for treatment, processing or disposal elsewhere. The sludge and other materials contained in these sites are often toxic and potentially harmful to the environment. Many of the methods developed to treat or process such waste require a controlled and consistent feed of waste material to the processing equipment in order for the processing equipment to operate at efficient levels.

Systems incorporating vacuum equipment and piping have been used to transport viscous sludge and semi-solid waste material. However, such vacuum systems alone have been found to be insufficient for the effective transport of highly viscous material due to the inherent characteristics of such materials. Highly viscous materials resist flowing due to friction and consequently often clog intake and discharge lines of such vacuum systems. This results in delivery of the waste material in slugs, rather than in a continuous flow, and thus provides an inconsistent delivery of the waste to the intended delivery site.

Combining a vacuum system with a mechanical pump to assist in the transport of viscous sludge has been proposed. One such device is that described in U.S. Pat. No. 4,924,898 to William R. Evenson. This device proposed using a centrifugal pump attached to the sludge receiving end on the intake line of a vacuum hose. The centrifugal pump was intended to serve as a booster for the vacuum pump by pushing sludge into and through the intake line. A disadvantage associated with the system is that the centrifugal pump must be fixed at the end on the vacuum intake line so that it can be placed directly into the sludge to be transported. Locating the centrifugal pump on the intake line increases its weight and makes the intact end of the intake line heavy and difficult to manipulate.

Another method for combining a mechanical pump and a vacuum pump is that proposed in U.S. Pat. No. 4,659,293 to William R. Evenson. There a blower powered vacuum system is utilized to draw sludge to a separator so that it may fall into a sealed hopper. A horizontal axis dual cylinder alternating piston pump is securely attached to the sealed hopper. Within the sealed hopper is an oscillating elbow conduit. The elbow conduit oscillates in alternating registration and communication with the two cylinders of the piston pump to transport the collected sludge from the sealed hopper to a storage location through a discharge line in communication with the elbow conduit of the hopper. A disadvantage of this design is that highly viscous sludge or semi-solids can impede or stop the oscillation of the conduit and shut down the movement of the sludge to the piston pump. Another disadvantage is that some highly viscous materials will not flow sufficiently to the piston to allow for efficient punping. Still another disadvantage is highly viscous semi-solids can cause great wear and tear on the oscillating conduit, the piston pump and the pump motor. This wear and tear will ultimately lead to downtime on the system and additional expense due to the need for increased repair, maintenance and replacement of the system components. Another disadvantage is that the flow of material in a system utilizing a piston pump will be highly pulsed. Finally, the oscillating conduit described in U.S. Pat. No. 4,659,293 is essentially a large valve. Such a valve is disadvantageous because the materials being transported can interfere with the seating of the valve. This interference can cause damage to the system or a shut down of material flow through the system due to blockage of the valve seating by an interfering object.

Still another disadvantage of the traditional vacuum systems is that these systems cannot be utilized on their own for the delivery of material to feed process equipment unless the process equipment is also under a vacuum and the flow of air goes through the equipment. Most process equipment is not designed to hold a vacuum. In addition, storage tanks filled by traditional vacuum systems must be designed for vacuum service. This increases the cost of the storage tanks and eliminates open-air access to the tanks as they are being filled.

Consequently, a need exist for improvements in sludge transporting equipment that will provide a continuous flow of highly viscous sludge and semi-solid material for further processing or disposal at atmospheric pressure with increased efficiency and with a decrease in the maintenance and repair cost of the transporting equipment.

SUMMARY OF INVENTION

The present invention provides a sludge transporting system and apparatus designed to satisfy the aforementioned needs. It is contemplated for use in vacuuming and transporting highly viscous sludge and semi-solids, or slurries having a high solids content, with a continuous flow of the material. This system has a dual conveying means incorporating a vacuum system with a progressive cavity pump. Primary conveyance is achieved by the vacuum system that pulls the material to be conveyed to a transfer chamber that is maintained at a low-pressure environment. The transported material then falls by gravity into the inlet of a progressive cavity pump that is also maintained at a low-pressure environment. The progressive cavity pump provides secondary conveyance to a collection area that is typically at atmospheric pressure.

The system incorporates a vacuum source, a means for creating a vacuum in the vacuum chamber, a plurality of chamber inlet hoses, a progressive cavity pump mounted to the vacuum chamber and a discharge line from the progressive cavity pump. Ideally, the system components may be mounted on skids for ease in transporting the the system to a work site. The progressive cavity pump requires less maintenance that other type pumps such as a piston pump.

The system allows the collection of sludge and semi-solids from a single location or source or from multiple locations or sources with a discharge that is constant and controllable. Slurries having a high solids content are readily transportable as are highly viscous sludges and semi-solids. The system provides for the continuous delivery of slurries or sludges to a container or disposal area maintained in an open atmosphere environment. The system provides for discharge from the vacuum chamber, via the progressive cavity pump, while the vacuum chamber is still in a vacuum state. Water or other additives may be readily added to the vacuum chamber for the treatment of the collected material when the system is in operation. The entire system is readily transportable with a minimum of set up time required.

The vacuum chamber and its inlets are configured to allow non-flowable material to be delivered or dumped into the inlet of the progressive cavity pump without bridging and without becoming lodged in the vacuum chamber. The walls of the vacuum chamber are configured to conform to the pump inlet and sloped to prevent adherence or sticking of highly viscous sludges.

The screw path of the progressive cavity pump used in the system aids in the mixing of additives with the material being conveyed. Such a pump may also be reversed to pull material back into the chamber and clear the discharge line. This is useful when changing the discharge line location.

The system affords many uses in industrial sites. These include the conveyance of semi-solids and sludge for environmental clean up of waste sites and storage tanks. Other uses could be in the oil and gas drilling industry for the conveyance of slurries containing drill cuttings and other contaminated materials. The unique system allows simultaneous vacuuming and pumping of semi-solids, sludge or a solids-slurry mixture through the system to provide a continuous discharge of material that can be readily controlled.

DESCRIPTION OF PREFERRED EMBODIMENT

Figure 1:
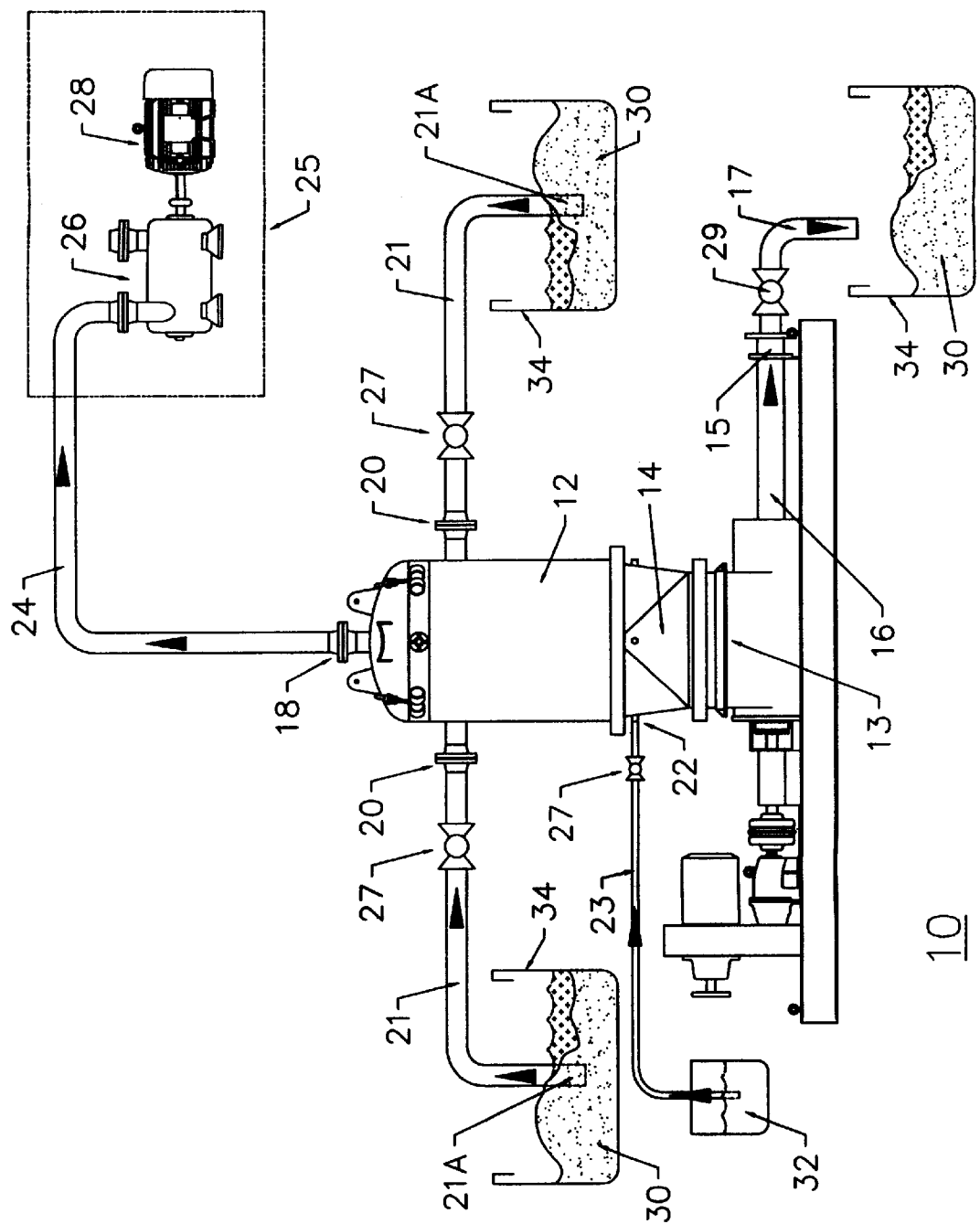
FIG. 1 is a schematic representation of the major system components of the present invention.

Referring now to the drawings and more particularly to FIG. 1 there is shown a schematic representation of the preferred embodiment hybrid conveying system (10) of applicant's invention. The system is comprised of a vertically orientated vacuum chamber (12) having funnel-shaped collection hopper (14) at its base, a vacuum port (18) at its upper end, and a plurality of inlet ports (20) and (22). The vacuum port (18) is connected to vacuum line (24) that is in turn connected to a vacuum source (25) such as that provided by a blower (26) powered by a motor (28). The vacuum source (25) is intended to create a vacuum of a desired pressure range within the vacuum chamber (12) and corresponding suction at the inlet ports (20) and (22).

A material suction line (21) having a control valve (27) is connected to each of the inlet ports 20. The material suction line (21) has a suction end (21A) for vacuuming material (30) from a collection area (34) and conveying the vacuumed material (30) into the vacuum chamber (12) through the chamber inlet port (20). The collection area (34) may be a waste disposal site such as a landfill, a storage tank, or processing equipment. Opening and closing the control valve (27) controls the flow of material (30) into the chamber (12).

In the preferred embodiment the suction lines (21) are flexible hoses. The diameter of the suction line (21) may vary but it is thought that a suction line of at least 3 inches in diameter would be suitable in most situations.

A plurality of secondary suction lines (23) having a valve (27) and connected to an inlet port (22) may also be utilized. The secondary suction lines (23) may be used to introduce water or treatment additives from additive tanks (32) into the vacuum chamber (12) to enhance the flow or otherwise treat the material (30) that is transported and collected in the chamber (12). Introduction of additives into the chamber (12) may be accomplished while a vacuum is created in the chamber (12) by the vacuum source (25).

The inlet (13) of a progressive cavity pump (16) is mounted to the base of the vacuum chamber (12) below the collection hopper (14) in a manner that will maintain the vacuum created in the vacuum chamber (12) while the system is in operation. The outlet (15) of the pump (16) is connected to a material discharge line (17). The discharge line (17) may have a discharge control valve (29). Material (30) from the collection hopper (14) is delivered to the pump (16) through the pump inlet (13) and discharged by means of pump (16) through the pump outlet (15) and through the discharge line (17) to a collection site (34). The collection site (34) is typically at atmospheric pressure. The material (30) is transported to the collection site (34) via the pump (16) while the vacuum created in chamber (12) is being maintained by the vacuum source (25) and as new material (30) is drawn into chamber (12).

In the preferred embodiment the progressive cavity pump is the NM Series NEMO® pump manufactured by Netzsch, Incorporated, though other screw-type progressive cavity pumps capable of handling and delivering a continuous flow of highly viscous materials may be utilized.

For operation of the apparatus (10) the blower (26) creates a vacuum in the vacuum chamber (12) by providing suction at the vacuum port (18) by means of vacuum line (24). The vacuum so created produces suction at each chamber inlet (20) and at each intake end (21A) of a suction line (21). The device allows for a plurality of chamber inlets (20) and suction lines (21) so that material (30) may be transported from multiple locations. The intake end (21A) of a desired suction line (21) is directed to the material (30) to be collected. The material (30) is then sucked through the line (21) to the chamber inlet (20) for delivery into the vacuum chamber (12).

The material (30) so delivered falls to the base of the chamber (12) and is collected in the hopper (14). From the hopper (14) the material is introduced into the inlet (13) of the progressive cavity pump (16) and from the pump (16) to the pump outlet (15) and then through the discharge line (17) to a collection site (34) for ultimate treatment or disposal of the material.

Figure 2:
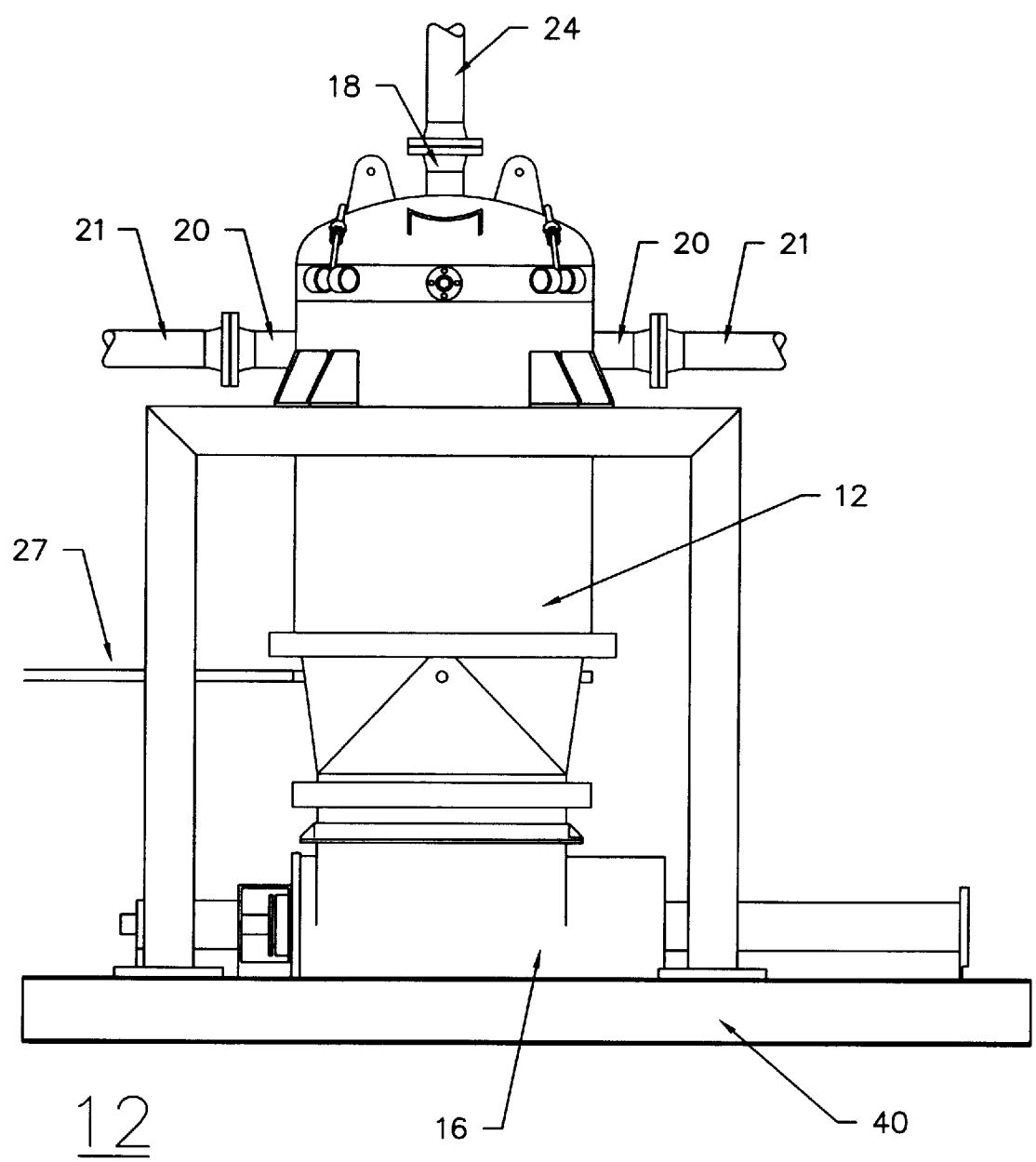
FIG. 2 is a side elevation view of the vacuum chamber and pump of the present invention.

In FIG. 2 the vacuum chamber (12) is shown mounted on a skid (40) for transportation to a job site. The main component of the system, such as the blower (26) and motor (28), may also be mounted on a skid or skids for ease in transporting and setting up the system at a job site. Once on site the vacuum line (24) and suction lines (21) are connected to the vacuum chamber (12) by flanges (33) or other connecting means for use. Use of the skid or skids (40) allows the entire system (10) to be readily assembled for use and then disassembled to move the conveying system to another location.

Figure 4:
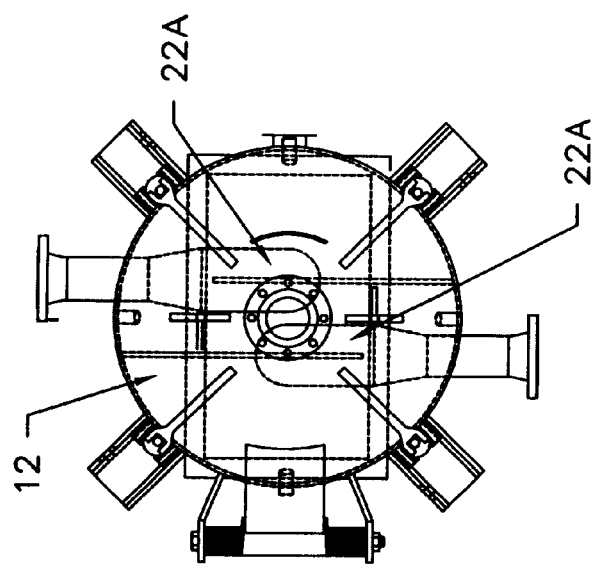
FIG. 4 is a cross-section top view of the vacuum chamber and chamber inlets of the present invention.
Figure 3:
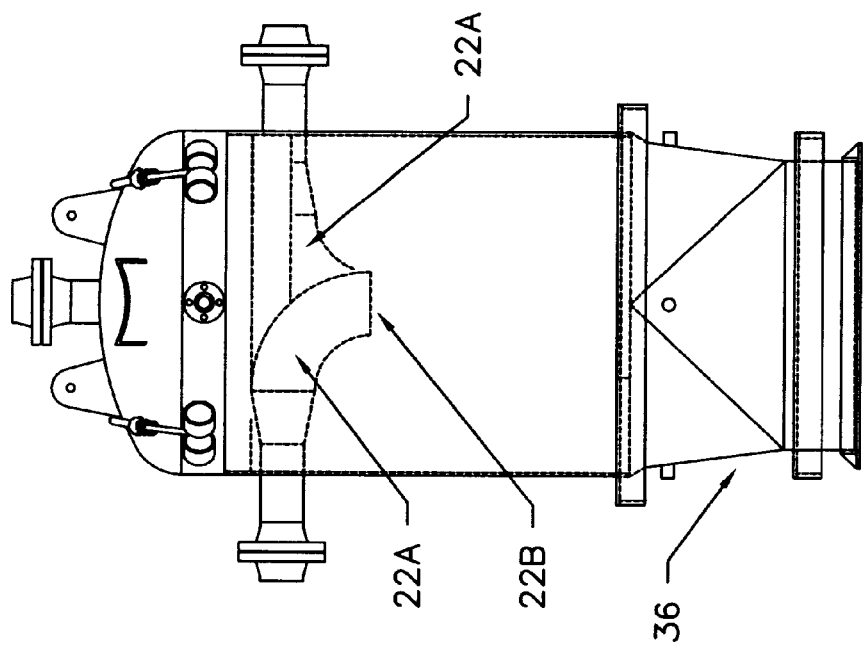
FIG. 3 is a cross-sectional side view of the vacuum chamber of FIG. 2.

As shown in FIG. 3 and FIG. 4, chamber inlet extension pipes (22A) from chamber inlets (22) extend to the center of the chamber (12). The inlet extension pipes (22A) have curved discharged ends (22b) directed downward over the inlet (13) of pump (16). This facilitates the delivery of sludge material to the pump (16). To further assist in the delivery of sludge material to the pump (16), the lower sidewalls (36) of the chamber (12) are sloped or funneled to transition and conform to the inlet (13) of pump (16). The sloped or funneled sidewalls (36) serve to prevent sticking of the sludge material on the walls of chamber (12). The inlet extension pipes (22A) and the sloped sidewalls (36) enhance the delivery of sludge waste to the pump (16).

It is thought that the apparatus and method for the hybrid conveying system described herein and many of its intended advantages will be understood from the foregoing description. It is also thought that it is apparent that various changes may be made in form, construction, and arrangement of the parts of the apparatus and method without departing from the spirit and scope of the invention or sacrificing all of its material advantages, the form herein described being merely illustrative of the preferred embodiment of the invention.

I claim:

1. A system for transporting a quantity of highly viscous material comprising:
   (a) a blower;
   (b) a vertically orientated vacuum chamber having an upper end and a lower base end, a vacuum port at said upper end of said chamber, a plurality of inlet ports, and a funnel-like hopper at said base end of said chamber, said hopper having a discharge end;
   (c) a vacuum line from said blower to said vacuum port of said chamber for creating a vacuum in said chamber when said blower is engaged;
   (d) a plurality of material suction lines, each of said material suction lines having an intake end and a discharge end, each said discharge end of each said material suction line being attached to a selected one of said inlet ports of said vacuum chamber;
   (e) a progressive cavity pump having a pump inlet and a pump outlet, said pump inlet mounted to said discharge end of said hopper so as to maintain said vacuum in said vacuum chamber created by said blower; and
   (f) a discharge line having an inlet end and an outlet end, said inlet end of said discharge line being connected to said outlet of said progressive cavity pump for discharging a flow of material from said suction line, through said vacuum chamber, said vacuum chamber hopper, and said progressive cavity pump, and through said outlet end of said discharge line.

2. The system for transporting highly viscous sludge as recited in claim 1, wherein said vacuum chamber has at least one treatment additive inlet port.

3. A method of transporting a highly viscous material comprising the steps of:
   a) providing a quantify of material to be transported;
   b) providing a blower;
   c) providing a vacuum chamber said vacuum chamber having a vacuum port, a plurality of suction inlet ports, and a discharge outlet;
   d) providing a progressive cavity pump, said progressive cavity pump having and inlet and an outlet;
   e) mounting a progressive cavity pump at said pump inlet to said discharge outlet of said vacuum chamber;
   f) mounting a vacuum line from said blower to said vacuum port of said vacuum chamber;
   g) mounting a suction line to each of said suction inlet ports from said quantity of material;
   h) mounting a material discharge line to said pump outlet of said progressive cavity pump;
   i) operating said blower so as to create a vacuum in said vacuum chamber and thereby create a suction in said suction lines for transporting said material through said suction lines to said vacuum chamber;
   j) receiving said transported material from said discharge outlet of said chamber into said pump inlet of said progressive cavity pump; and
   k) engaging said progressive cavity pump so as to further transport said material from said progressive cavity pump inlet through said pump to said pump outlet and through said material discharge line for continuous discharge of said transported material to a desired location.

4. The method as recited in claim 3, further comprising a means for delivering a treatment additive to said vacuum chamber when said vacuum has been created in said chamber.

5. The method as recited in claim 3 wherein said transportation of said transported material to said vacuum chamber is simultaneous with said discharge of said transported material from said material discharge line.

6. The method as recited in claim 5 wherein said discharge of transported material from said material discharge line occurs at atmospheric pressure.

7. A sludge conveying apparatus comprising:
   a) a vacuum chamber;
   b) a means for creating a vacuum in said vacuum chamber;
   c) a plurality of suction hoses in communication with said vacuum chamber for providing a continuous flow of sludge into said vacuum chamber;
   d) a progressive cavity pump mounted to said vacuum chamber, said progressive cavity pump having an inlet for receiving said flow of sludge from said vacuum chamber and an outlet for discharging said flow of sludge from said vacuum chamber; and
   e) a discharge hose connected to said progressive cavity pump outlet for delivering said flow of sludge from said progressive cavity pump to a desired location.

8. The sludge conveying apparatus as recited in claim 7, further comprising a means for inserting sludge treatment additives into said vacuum chamber while said vacuum is maintained in said chamber.

9. The sludge conveying apparatus as recited in claim 7, wherein said flow of sludge is delivered from said chamber to said inlet of said progressive cavity pump by gravity.

10. The sludge conveying apparatus as recited in claim 7, wherein said chamber and said progressive cavity pump are mounted on a skid.

11. The apparatus as recited in claim 10 wherein said means for creating a vacuum is mounted on a skid.

12. The apparatus as recited in claim 7 wherein said progressive cavity pump is a screw-type progressive cavity pump.

13. The apparatus as recited in claim 7 wherein said delivering said flow of sludge from said progressive cavity pump to a desired location includes delivery of said flow of sludge to a location at atmospheric pressure while said vacuum is maintained in said vacuum chamber.

14. The apparatus as recited in claim 8 wherein said plurality of suction hoses in communication with said vacuum chamber for providing a continuous flow of sludge into said vacuum chamber are connected to inlet extension pipes that extend toward a point in said vacuum chamber over said inlet of said progressive cavity pump.

* * * * *